(12) United States Patent
Monroy et al.

(10) Patent No.: US 8,428,464 B2
(45) Date of Patent: Apr. 23, 2013

(54) METHODS AND DEVICES FOR DETECTION OF A FIRST SIGNAL SUPERIMPOSED ON A SECOND SIGNAL

(75) Inventors: Idelfonso Tafur Monroy, Charlottenlund (DK); Jorge Seoane Gomez, Hillerod (DK)

(73) Assignee: DTU, Technical University of Denmark, Lyngby (DK)

( * ) Notice: Subject to any disclaimer, the term of this patent is extended or adjusted under 35 U.S.C. 154(b) by 652 days.

(21) Appl. No.: 12/531,160

(22) PCT Filed: Feb. 22, 2008

(86) PCT No.: PCT/DK2008/000078
§ 371 (c)(1), (2), (4) Date: Feb. 1, 2010

(87) PCT Pub. No.: WO2008/110169
PCT Pub. Date: Sep. 18, 2008

(65) Prior Publication Data
US 2010/0142963 A1      Jun. 10, 2010

Related U.S. Application Data

(60) Provisional application No. 60/894,761, filed on Mar. 14, 2007.

(30) Foreign Application Priority Data

Mar. 14, 2007   (EP) ..................................... 07388014

(51) Int. Cl.
*H04B 10/00* (2006.01)
*H04B 10/04* (2006.01)

(52) U.S. Cl.
USPC .............................. 398/115; 398/176; 398/183

(58) Field of Classification Search ................... 398/183, 398/115, 176
See application file for complete search history.

(56) References Cited

U.S. PATENT DOCUMENTS 3,483,624 A * 12/1969 Smith ............................ 33/282
3,659,204 A    4/1972  Hufford
(Continued)

FOREIGN PATENT DOCUMENTS

DE       4440113 A1    5/1996

OTHER PUBLICATIONS

Zhang et al; ER3+-Yb3+ co-doped glass waveguid amplifiers usin ion exchange and field assisted annealing; 2006; science direct.*

(Continued)

*Primary Examiner* — Kenneth N Vanderpuye
*Assistant Examiner* — Amritbir Sandhu
(74) *Attorney, Agent, or Firm* — Mollborn Patents, Inc.; Fredrik Mollborn

(57) ABSTRACT

Methods and devices for detecting at least one first input signal superimposed on at least one second signal. The method comprises the steps of providing said at least one first input signal superimposed on at least one second signal to at least one half-wave rectifier; transforming, in said at least one half-wave rectifier, said at least one first input signal superimposed on at least one second signal into a half-wave rectified signal; providing said half-wave rectified signal to an envelope detector; and transforming, in said envelope detector, said half-wave rectified signal into an envelope signal and wherein the at least one half-wave rectifier comprises at least one optoelectronic device. In this way, a simpler and cheaper method and/or device are provided for e.g. detecting a transmitted information signal superimposed on a high frequency carrier signal.

21 Claims, 14 Drawing Sheets

U.S. PATENT DOCUMENTS

| | | | | |
|---|---|---|---|---|
| 4,190,838 | A * | 2/1980 | Kemp | 342/20 |
| 5,199,086 | A | 3/1993 | Johnson et al. | |
| 5,323,406 | A | 6/1994 | Yee et al. | |
| 5,859,611 | A | 1/1999 | Lam et al. | |
| 6,483,624 | B1 * | 11/2002 | Otani et al. | 398/201 |
| 7,761,012 | B2 * | 7/2010 | Yu et al. | 398/188 |
| 7,801,450 | B2 * | 9/2010 | Abe et al. | 398/193 |
| 8,032,034 | B2 * | 10/2011 | Yoshino et al. | 398/183 |
| 8,135,288 | B2 * | 3/2012 | Franklin | 398/196 |
| 8,165,474 | B2 * | 4/2012 | Zheng et al. | 398/193 |
| 2001/0052761 | A1 * | 12/2001 | Taniguchi et al. | 322/28 |
| 2002/0071109 | A1 * | 6/2002 | Allen et al. | 356/5.01 |
| 2003/0103255 | A1 * | 6/2003 | Park | 359/239 |
| 2006/0083520 | A1 * | 4/2006 | Healey et al. | 398/200 |
| 2008/0101798 | A1 * | 5/2008 | Healey et al. | 398/115 |
| 2008/0107428 | A1 * | 5/2008 | Abe et al. | 398/187 |
| 2009/0052586 | A1 * | 2/2009 | Iida | 375/340 |
| 2010/0142963 | A1 * | 6/2010 | Monroy et al. | 398/115 |
| 2010/0196013 | A1 * | 8/2010 | Franklin | 398/115 |
| 2010/0247104 | A1 * | 9/2010 | Yu et al. | 398/115 |
| 2012/0294627 | A1 * | 11/2012 | Qi et al. | 398/183 |

OTHER PUBLICATIONS

Monroy et al; All-optical envelope detection for wireless photonic Communication.*

Kassar etal; simultaneous optical carrier and radio frequency re-modulation in radio-over-fiber systems employing reflective SOA modulators; 2007; IEEE; pp. 798-799.*

Patent Cooperation Treaty International Search Report and Written Opinion of the International Searching Authority. International application No. PCT/DK2008/000078. Date of the actual completion of the international search: Apr. 8, 2008.

* cited by examiner

METHODS AND DEVICES FOR DETECTION OF A FIRST SIGNAL SUPERIMPOSED ON A SECOND SIGNAL

CROSS-REFERENCE TO RELATED APPLICATIONS

This application is a National Phase application of International Application No. PCT/DK2008/000078, filed on Feb. 22, 2008, and entitled "A method and a device for detection of a first signal superimposed on a second signal", which claims priority to European Application No. EPO 07388014.8, filed on Mar. 14, 2007, and to U.S. Provisional Application No. 60/894,761, also filed on Mar. 14, 2007. The contents of these applications are incorporated herein by reference.

FIELD OF THE INVENTION

The invention relates to a method for detecting at least one first input signal superimposed on at least one second signal. The invention further relates to a corresponding device.

BACKGROUND OF THE INVENTION

A wirelessly transmitted signal may comprise a transmitted information signal, e.g. data such as phone-conversations, video-phone-conversations, WWW-applications, video and audio applications, file transfer or sharing and any type of digital and/or analogue data, Bluetooth data, traditional radio signals, etc., superimposed on a carrier signal with a high(er) frequency. In order to recover the transmitted information signal, it is today common to use an antenna to receive the wireless signal, a local oscillator generating a high frequency RF signal substantially tuned to the received high frequency carrier signal, a phase comparator for continuous tuning and locking of the high frequency RF signal generated by the local oscillator to the received high frequency carrier signal of the wireless transmitted signal and a high radio-frequency (RF) signal mixer. In the RF mixer, the locally generated high frequency RF signal and the received transmitted information signal superimposed on a high frequency carrier signal are mixed in order to obtain a baseband (low frequency) version of the transmitted information (desired data). This process is referred to as frequency down-conversion. Once the transmitted information signal has been recovered, it may be transmitted further or processed locally, depending on the application of the transmitted signal.

A problem of the prior art is the high costs of the components e.g. the local oscillator generating a high frequency RF signal, the phase comparator and the RF mixer, all functioning at high frequencies (e.g. in the range from 10-60 GHz) used to transmit wirelessly high bandwidth signals.

A further problem of the prior art is that the local oscillator is required to be tuned with substantial accuracy to the frequency of the received carrier signal. Said tuning can be complicated by drift in the carrier signal frequency or temperature changes.

Moreover, the bandwidth of the RF mixer and the frequency of the local oscillator are commonly fixed, e.g. by the manufacturer of the device, in its original design thereby making it difficult to accommodate higher bandwidths at later upgrades of a transmission system.

SUMMARY OF THE INVENTION

It is an object of the present invention to, among other things, solve the abovementioned problems. The abovementioned problems are solved by a method for detecting at least one first input signal superimposed on at least one second signal, the method comprising the steps of providing said at least one first input signal superimposed on at least one second signal to at least one half-wave rectifier; transforming, in said at least one half-wave rectifier, said at least one first input signal superimposed on at least one second signal into a half-wave rectified signal; providing said half-wave rectified signal to an envelope detector; and transforming, in said envelope detector, said half-wave rectified signal into an envelope signal and wherein the at least one half-wave rectifier comprises at least one optoelectronic device.

Consequently, it is an advantage that the method uses a half-wave rectifier and an envelope detector instead of an expensive local oscillator and high frequency mixer. Thus, the invention solves the problem of high cost components required for detecting at least one first input signal superimposed on at least one second signal.

Further, it is an advantage that the detection of the at least one first signal superimposed on at least one second signal (e.g. a transmitted information signal superimposed on a high-frequency carrier signal) is performed by a half-wave rectifier rectifying the input signal and extracting the information signal with an envelope detector. Hereby the requirement regarding substantially tuning a local oscillator frequency to the carrier frequency may be removed and thus the detection of the transmitted information signal may be simplified.

Additionally, the importance of drift in frequencies (such as for example the frequency of the local oscillator frequency and/or the carrier frequency) may be reduced/removed due to the use of a half-wave rectifier and an envelope detector in stead of a local oscillator and an RF mixer.

When the requirement regarding substantially frequency tuning of a local oscillator frequency to the receiver carrier frequency may be removed/reduced, the requirements for the transmitted information signal superimposed on a high frequency carrier signal may be simplified/removed/reduced as well and thus the system transmitting the information signal (at least one first signal) superimposed on a high-frequency carrier signal (at least one second signal) may also be simplified.

Moreover, due to the use of a half-wave rectifier and an envelope detector instead of a local oscillator and a RF mixer, no fixation of a frequency is required and thus upgrade of the method is straightforward at later updates e.g. higher frequencies used in the carrier signal.

In an embodiment of the invention, said at least one optoelectronic device is chosen from the group consisting of at least one optical electro-absorption modulator and at least one laser.

By using at least one optical electro-absorption modulator or a laser as half-wave rectifier, the method is able to transform an incoming electrical signal comprising a transmitted information signal superimposed on a high frequency carrier signal into an optical signal in the optical electro-absorption modulator.

In an embodiment of the invention, the step of providing said at least one first input signal superimposed on at least one second signal to said at least one optoelectronic device comprises providing said at least one first input signal superimposed on at least one second signal to at least one first electrical input of said at least one optoelectronic device.

In this way, the at least one first input signal superimposed on at least one second signal may be provided to a first electrical input of the optoelectronic device for further processing.

In an embodiment of the invention, the method further comprises the step of providing a light-source optical signal to at least one first optical input of said at least one optoelectronic device.

The light-source optical signal may be used to transform the at least one first signal superimposed on at least one second signal from an electrical domain into an optical domain in the optoelectronic device. The wavelength of the light-source may be chosen to, for example, suit further transmission and/or detection schemes e.g. a wavelength suitable for long-haul transmission.

In an embodiment of the invention, the method further comprises the step of applying at least one bias voltage to at least one electrical input of said at least one optoelectronic device.

By applying a bias voltage to the optoelectronic device, the method is able to alter the response curve of the optoelectronic device.

In an embodiment of the invention, the method further comprises the step of selecting a magnitude of said at least one bias voltage substantially equal to an extinction voltage of said at least one optoelectronic device.

By applying a bias voltage substantially equal to an extinction voltage of the optoelectronic device may enable the optoelectronic device to function as a half-wave rectifier.

In an embodiment of the invention, said envelope detector is chosen from the group of a semiconductor optical amplifier; a photo-diode; a laser and an optical electro-absorption modulator.

By choosing the envelope detector to be a semiconductor optical amplifier enables the method to output an optical signal from the envelope detector; by choosing a photo-diode enables the method to output an electrical signal from the envelope detector; by choosing a laser as envelope detector an all optical method may be obtained; by choosing an optical electro-absorption modulator as envelope detector enables the method to output an optical signal from the envelope detector and to reduce the number of required components e.g. from an optical electro-absorption modulator and an envelope detector to an optical electro-absorption modulator acting as an optical electro-absorption modulator and an envelope detector.

In an embodiment of the invention, the method further comprises the step of coupling an antenna electrically to said at least one first electrical input of said at least one optoelectronic device.

An antenna may provide an electrical signal to said optoelectronic device.

In an embodiment of the invention, the method further comprises the step of wirelessly receiving at least one signal comprising at least one first signal superimposed on at least one second signal with said antenna and providing said at least one received signal comprising at least one first signal superimposed on at least one second signal to said at least one first electrical input of said at least one optoelectronic device.

In this way, the antenna may provide a wireless signal to the optoelectronic device.

In an embodiment of the invention, said at least one first input signal superimposed on at least one second signal comprises at least one modulation signal superimposed on at least one high frequency signal.

In an embodiment of the invention, said light-source is a laser source.

In this way, the light-source may provide near-monochromatic coherent light-source optical signal to the optical electro-absorption modulator.

In an embodiment of the invention, said laser source emits light at a wavelength chosen from the group of 1510 nm-1590 nm and 1260 nm-1340 nm.

In this way, commercially available lasers may be utilized for providing a near-monochromatic light-source optical signal to the optoelectronic device.

Embodiments of the present invention also relates to a device corresponding to embodiments of the method.

More specifically, the invention relates to a device for detecting at least one first input signal superimposed on at least one second signal, the device comprising at least one half-wave rectifier and an envelope detector; wherein an output from said at least one half-wave rectifier comprising a half-wave rectified signal is provided to an input of said envelope detector and wherein the at least one half-wave rectifier comprises at least one optoelectronic device.

The device and embodiments thereof correspond to the method and embodiments thereof and have the same advantages for the same reasons.

Advantageous embodiments of the device are defined in the sub-claims and described in detail in the following.

DETAILED DESCRIPTION OF THE DRAWINGS

Figure 1:
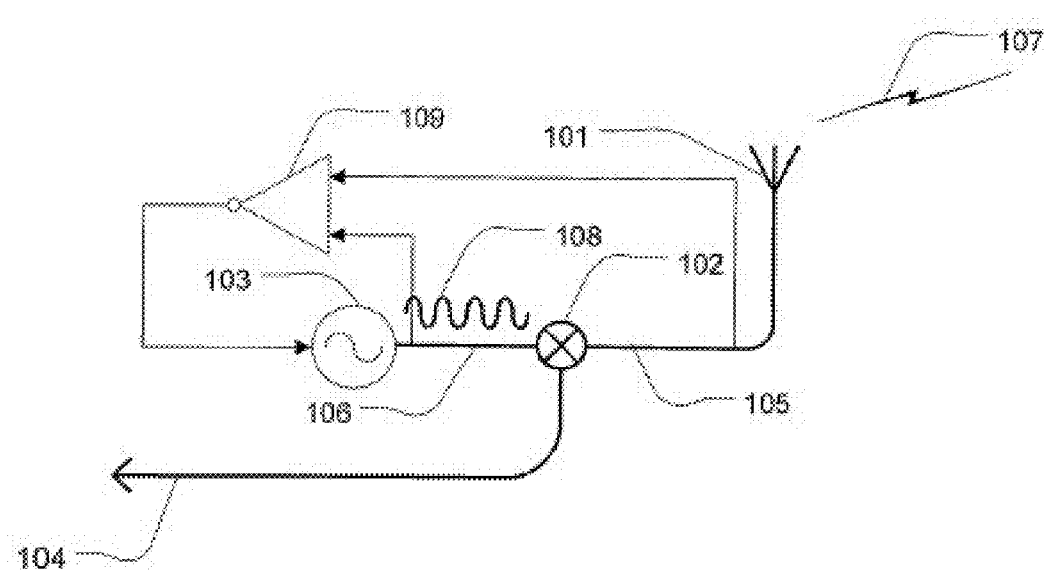
FIG. 1 schematically illustrates a system as known in the art for determining a transmitted information signal superimposed on a high frequency carrier signal.

FIG. 1 shows a system as known in the art for determining a transmitted information signal from a wirelessly transmitted signal. The system comprises an antenna (101), a RF mixer (102), a high frequency signal generating oscillator (103) and an output (104). The system may further comprise a phase comparator (109). Alternatively, e.g. in a so-called phase-locked-loop, the RF mixer (102) may act as a phase comparator (109).

In the prior art, the antenna (101) receives a wireless signal (107) comprising a transmitted information signal superimposed on a high frequency RF carrier signal. The antenna is connected to a RF mixer (102) and the RF wireless signal is transmitted to the RF mixer (102) from the antenna (101) via a first cable (105). The RF mixer is additionally connected to a high frequency signal generating oscillator (103) generating a high frequency RF signal (108) substantially tuned to the frequency of the high frequency RF carrier signal. The high frequency RF signal generated in the high frequency signal generating oscillator (103) is transmitted to the RF mixer (102) via a second cable (106). In the mixer (102), the wireless signal is multiplied with the high frequency RF signal of the oscillator (103) to yield a down-converted output signal (104). A first input of the phase comparator (109) may be connected to the antenna (101) and a second input of the phase comparator (109) may be connected to the output from the high frequency generating oscillator (103). From the two input signals, the phase comparator determines a difference between the high frequency carrier signal and the high frequency RF signal (108). Via a feedback loop, the phase comparator corrects any offset in the high frequency RF signal output from the high frequency signal generating oscillator in order to continuous tune and lock the high frequency RF signal (108) generated by the local oscillator (103) to the received high frequency carrier signal of the wireless transmitted signal.

Figure 2:
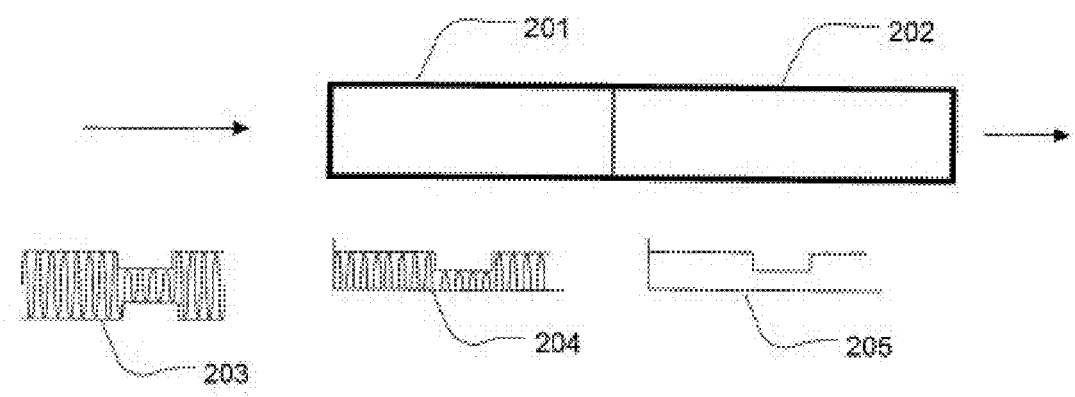
FIG. 2 schematically illustrates an embodiment of the invention comprising a half-wave rectifier and an envelope detector.

FIG. 2 shows an embodiment of the invention comprising a device for detection of a first signal superimposed on a second signal. The device comprises a half-wave rectifier (201), for example an optoelectronic device such as a laser or an optical electro-absorption modulator, and an envelope detector (202) such as, for example, a photo-detector or a laser. The half-wave rectifier (201) and the envelope detector may be in a single component. Alternatively, the half-wave rectifier (201) and the envelope detector (202) may be two separate components, for example connected via a cable, e.g. an electric cable, a data cable, an optical cable, etc. Alternatively or additionally, the half-wave rectifier (201) may be wirelessly connected to the envelope detector (202) e.g. via a free-space optics link.

A signal comprising a transmitted information signal superimposed on a high frequency RF carrier signal (203) may be input into the half-wave rectifier (201). In the half-wave rectifier, the information signal superimposed on a high frequency RF carrier signal (203) is half-wave rectified, i.e. either the positive or negative half of the signal (203) is passed while the other half of the signal is blocked, resulting in the half-wave rectified signal (204). The half-wave rectified signal is transmitted to the envelope detector (202) in which an envelope of the half-wave rectified signal (i.e. the transmitted information signal) is decoded from the half-wave rectified signal, thus resulting in the transmitted information signal (205), which may be further transmitted.

Figure 3:
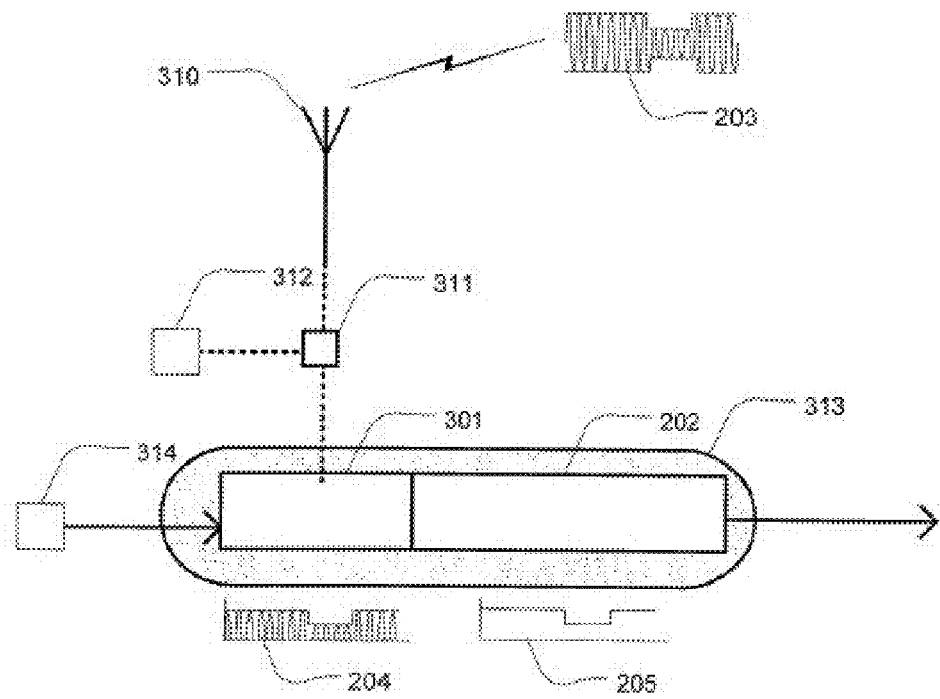
FIG. 3 schematically illustrates an additional embodiment in which the half-wave rectifier is an optical electro-absorption modulator.

FIG. 3 shows an embodiment in which the half-wave rectifier is an optoelectronic device such as, for example, an optical electro-absorption modulator (301) or a laser such as a Fabry-Perot lasers or a distributed feedback laser (DFB) or a distributed Bragg reflector (DBR) or the like. The embodiment further comprises an envelope detector (202). In this embodiment, the optoelectronic device and the envelope detector are indicated as a single component (313) but as mentioned above, the optoelectronic device (301) and the envelope detector (202) may be two separate components connected via e.g. a data cable, an electric cable and/or an optical cable and/or wirelessly e.g. via free-space optics.

The optoelectronic device may be connected to an antenna (310). The antenna (310) may, for example, be connected to a first input of the optoelectronic device (301) e.g. an electrical input. The antenna may be any type of antenna such as for example a dipole antenna, a magnetic loop antenna, parabolic antenna, a micro-strip antenna and/or an antenna array. Alternatively, the antenna (310) may be any type of antenna. The antenna (310) may provide a received wireless signal comprising a transmitted information signal superimposed on a high frequency RF carrier signal (203) to the optoelectronic device (301).

Alternatively or additionally, the optoelectronic device may be connected to an electric cable via a first electric input of the optoelectronic device (301). The electric cable may, for example, carry a signal from a signal source, said signal comprising a transmitted information signal superimposed on a high frequency RF carrier signal (203), to the optoelectronic device (301).

Further, the optoelectronic device may be connected to a bias voltage generator (312) such as for example a battery cell or any other suitable power source. The bias voltage generator may, for example be connected to a second input of optoelectronic device (301) e.g. an electrical input. Alternatively, the bias voltage generator (312) may be connected to the same input of the optoelectronic device as the antenna i.e. the first input of the optoelectronic device. The bias voltage generator (312) may be connected to the same input of the optoelectronic device as the antenna via e.g. a connector-box (311). The bias voltage generator (312) may provide a bias voltage to the optoelectronic device (301).

In an embodiment where the optoelectronic device (301) may be an optical electro-absorption modulator (301), the optical electro-absorption modulator (301) may be connected to a light-source (314) such as for example a laser source, e.g. multimode or single-mode lasers such as Fabry-Perot lasers, distributed feedback laser (DFB), distributed Bragg reflector (DBR), optical electro-absorption modulator lasers (EML), coupled cavity semiconductor lasers or mode locked laser. The laser source may be connected to the optical electro-absorption modulator via an optical fiber cable. Alternatively, the laser source may be any type of laser source. The light source may be connected to a third input of the optical electro-absorption modulator (301) e.g. an optical input.

In an embodiment where the optoelectronic device (301) may be a laser (301), the laser (301) may not require to be connected to a light-source (314) because the laser (301) may act as a light source itself. Alternatively, the laser (301) may be connected to a light-source (314) such as for example a laser source (314), e.g. multimode or single-mode lasers such as Fabry-Perot lasers, distributed feedback laser (DFB), distributed Bragg reflector (DBR), optical electro-absorption modulator lasers (EML), coupled cavity semiconductor lasers or mode locked laser. The light source 314 may, for example, be connected to the laser (301) via an optical fiber cable. Alternatively, the laser source may be any type of laser source. The light source may be connected to a third input of the optical electro-absorption modulator (301) e.g. an optical input.

The optoelectronic device (e.g. a laser or an optical electro-absorption modulator) may be connected to an optical cable via an optical input of the optoelectronic device (301). The optical cable may, for example, transmit a signal from a signal source, said signal comprising a transmitted information signal superimposed on a high frequency RF carrier signal (203), to the optoelectronic device (301).

Therefore, the optoelectronic device (301) may receive a wireless signal via an antenna and/or a transmitted signal via an optical and/or electrical cable.

In an embodiment of the invention, the light source may provide an optical signal with a wavelength of substantially 1310 nm. Alternatively, the light source may provide an optical signal with a wavelength of substantially 1550 nm. Alternatively, the light source may provide an optical signal with a wavelength of substantially 1200 nm. Alternatively, the light source may provide an optical signal with a wavelength chosen in the range of 900 nm to 1800 nm. Alternatively, the light source may provide an optical signal to the optical electro-absorption modulator with any wavelength.

In an additional embodiment of the invention, the light source may provide an optical signal with a power of substantially 10 dBm e.g. 10 dBm+/−0.1 dBm. Alternatively, the light source may provide an optical signal with a power of substantially 20 dBm e.g. 20 dBm+/−0.1 dBm. Alternatively, the light source may provide an optical signal to the optical electro-absorption modulator with any power.

A wireless signal comprising a transmitted information signal superimposed on a high frequency RF carrier signal (203) may be transmitted from any suitable device and/or system, e.g. a mobile telephone, a WLAN, telecommunication backhaul, etc., to e.g. the device represented in FIG. 3. The antenna (310) may receive the transmitted wireless signal comprising a transmitted information signal superimposed on a high frequency RF carrier signal (203). From the antenna, the transmitted wireless signal comprising a transmitted information signal superimposed on a high frequency RF carrier signal (203) may be transmitted to the first input of the optoelectronic device (301).

In an embodiment where the optoelectronic device is an optical electro-absorption modulator, the optical electro-absorption modulator may act as both half-wave rectifier and envelope detector provided that the response-time of the optical electro-absorption modulator is fast enough to follow the transmitted information signal (205) but too slow to follow the high-frequency RF carrier signal.

In an embodiment where the optoelectronic device is a laser, the laser may act as both half-wave rectifier and envelope detector provided that the response-time of the laser is fast enough to follow the transmitted information signal (205) but too slow to follow the high-frequency RF carrier signal.

In an embodiment where the optoelectronic device is an optical electro-absorption modulator (301), the optical input from the light-source (314) may be modulated according to a bias voltage from the bias voltage generator (312) and/or the signal comprising a transmitted information signal superimposed on a high frequency RF carrier signal (203).

Figure 4:
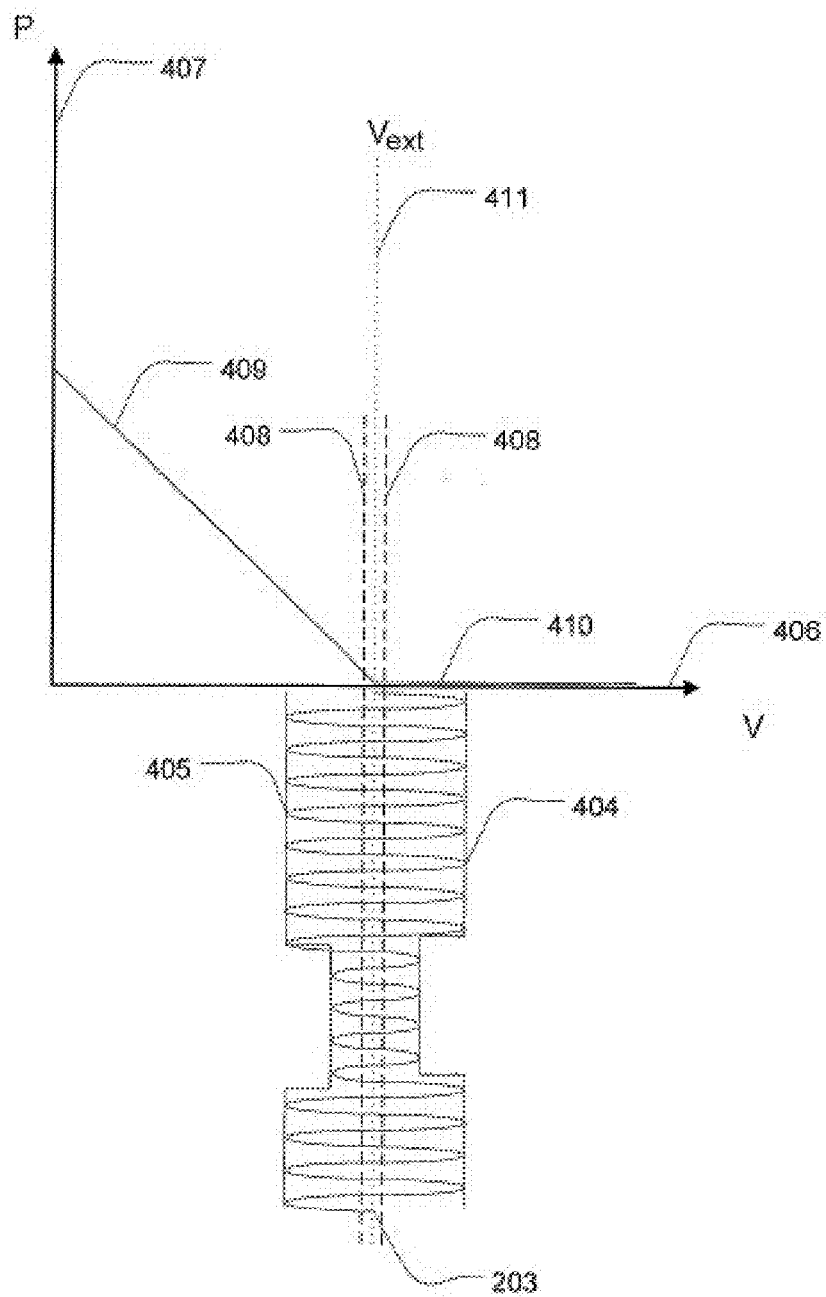
FIG. 4 schematically illustrates a response curve of an optical electro-absorption modulator in which curve a bias voltage substantially is equal to an extinction voltage of the optical electro-absorption modulator.

For example, in an embodiment schematically illustrated in FIG. 4, the bias voltage generator (312) may provide a bias voltage (408) substantially equal to an extinction voltage (411) of the optical electro-absorption modulator (301) such that said optical electro-absorption modulator (301) modulates substantially half of the signal comprising a transmitted information signal superimposed on a high frequency RF carrier signal (203), e.g. the half (405) of the signal, onto the optical signal from the light-source (314) thereby modulating the optical signal from the light-source (314) according to substantially one half of the signal comprising a transmitted information signal superimposed on a high frequency RF carrier signal (203). The optical electro-absorption modulator (301) may further substantially block the other half of the signal comprising a transmitted information signal superimposed on a high frequency RF carrier signal (203), e.g. the half (404) of the signal, thereby substantially preventing the other half of the signal comprising a transmitted information signal superimposed on a high frequency RF carrier signal (203) from being modulated onto the optical signal from the light-source (314). The extinction voltage may be defined as the voltage above which the optical electro-absorption modulator absorbs light by a substantial amount e.g. 90% or above of the light from the light source 314 is absorbed in the optical electro-absorption modulator. Thereby, the optical electro-absorption modulator may substantially act as a half-wave rectifier substantially half-wave rectifying the signal comprising a transmitted information signal superimposed on a high frequency RF carrier signal (203) to the signal (204, 405). In FIG. 4, the axis (406) illustrates a bias voltage and/or signal comprising a transmitted information signal superimposed on a high frequency RF carrier signal axis and the axis (407) illustrates the response of the optical electro-absorption modulator (301) to the bias voltage (408) and/or signal comprising a transmitted information signal superimposed on a high frequency RF carrier signal provided by the bias voltage generator (312) and/or antenna (310). (409) represents an optical electro-absorption modulator response to a voltage below or equal to the extinction voltage (411) and (410) represents an optical electro-absorption modulator response to a voltage above the extinction voltage (411).

Alternatively, the bias voltage generator (312) may provide any bias voltage (408) to the optical electro-absorption modulator (301).

Figure 5:
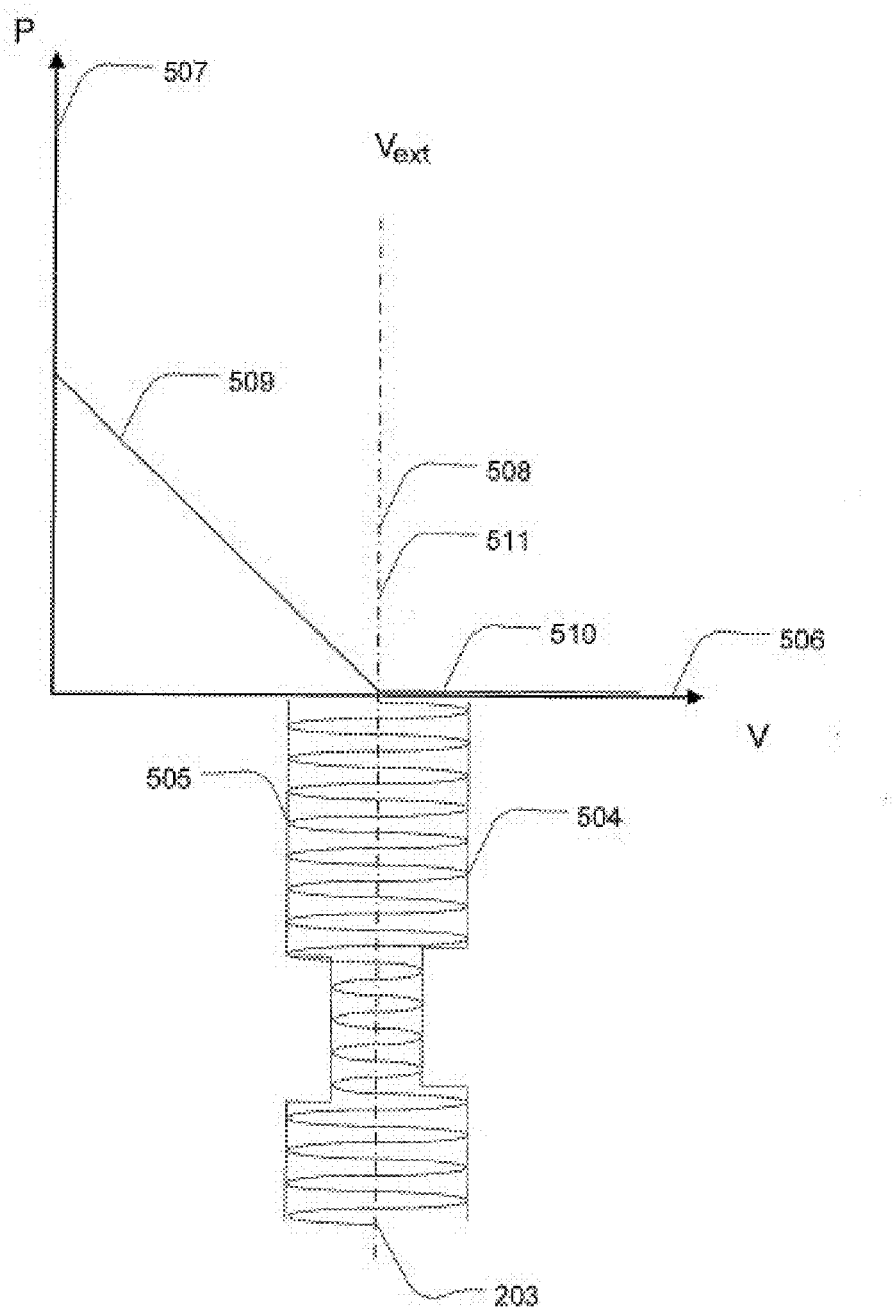
FIG. 5 schematically illustrates a response curve of an optical electro-absorption modulator in which curve a bias voltage is equal to an extinction voltage of the optical electro-absorption modulator.

In an embodiment, schematically illustrated in FIG. 5, the bias voltage generator (312) may provide a bias voltage (508) equal to an extinction voltage (511) of the optical electro-absorption modulator (301) such that said optical electro-absorption modulator (301) modulates half of the signal comprising a transmitted information signal superimposed on a high frequency RF carrier signal (203), e.g. the half (505) of the signal, onto the optical signal provided by the light-source (314) thereby modulating the optical signal from the light-source (314) according to one half of the signal comprising a transmitted information signal superimposed on a high frequency RF carrier signal (203). The optical electro-absorption modulator (301) may further block the other half of the signal comprising a transmitted information signal superimposed on a high frequency RF carrier signal (203), e.g. the half (504) of the signal, thereby preventing the other half of the signal comprising a transmitted information signal superimposed on a high frequency RF carrier signal (203) from being modulated onto the optical signal from the light-source (314). Thereby, the optical electro-absorption modulator may act as a half-wave rectifier half-wave rectifying the signal comprising a transmitted information signal superimposed on a high frequency RF carrier signal (203) to the signal (204, 505). In FIG. 5, the axis (506) illustrates a bias voltage and/or signal comprising a transmitted information signal superimposed on a high frequency RF carrier signal axis and the axis (507) illustrates the response of the optical electro-absorption modulator (301) to the bias voltage (508) and/or signal comprising a transmitted information signal superimposed on a high frequency RF carrier signal provided by the bias voltage generator (312) and/or the antenna (310). (509) represents an optical electro-absorption modulator response to a voltage below or equal to the extinction voltage (511) and (510) represents an optical electro-absorption modulator response to a voltage above the extinction voltage (511).

Alternatively, the bias voltage generator (312) may provide any bias voltage (508) to the optical electro-absorption modulator (301).

Figure 6:
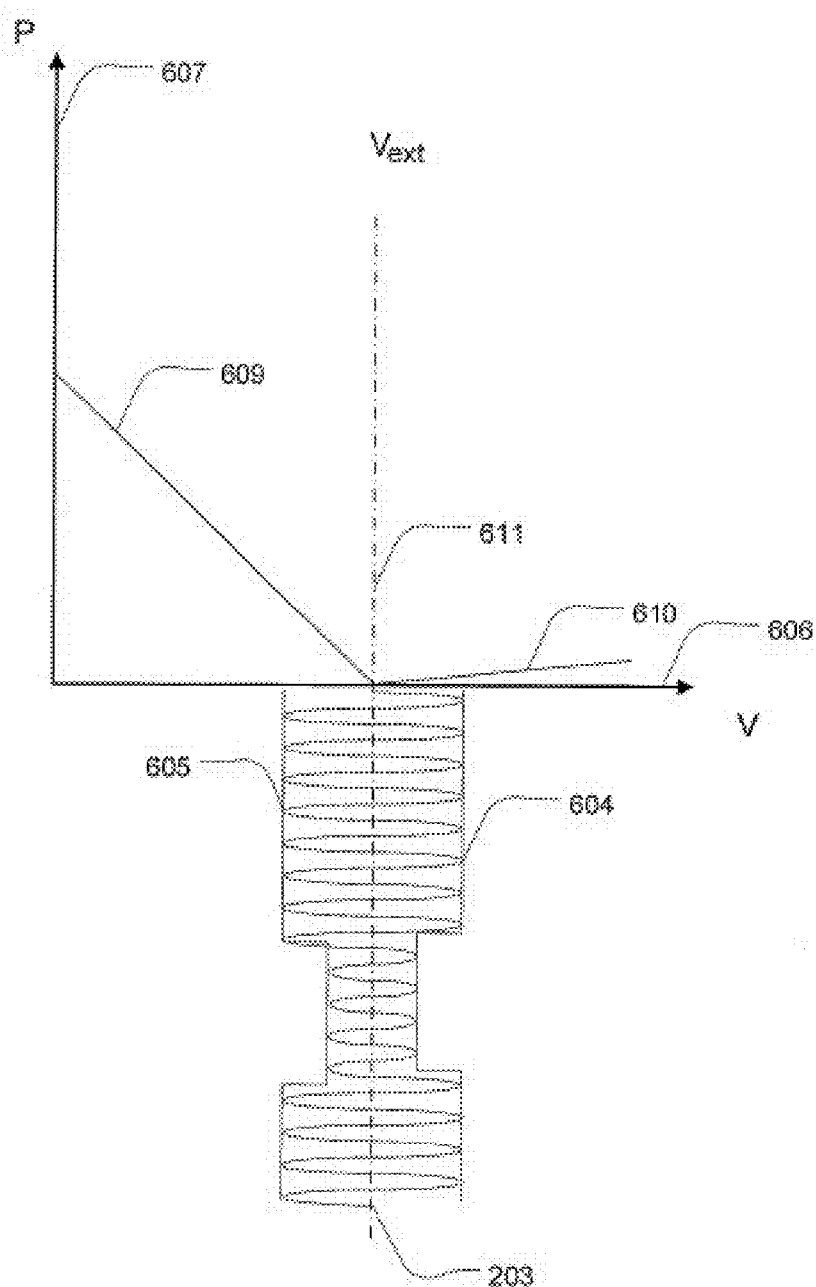
FIG. 6 schematically illustrates a response curve of an optical electro-absorption modulator having a non-zero response above an extinction voltage.

In an embodiment, schematically illustrated in FIG. 6, the optical electro-absorption modulator (301) may have a non-zero response (610) above the extinction voltage (611). In FIG. 6, the axis (606) illustrates a bias voltage and/or signal comprising a transmitted information signal superimposed on a high frequency RF carrier signal axis and the axis (607) illustrates the response of the optical electro-absorption modulator (301) to a bias voltage provided by the bias voltage generator (312) and/or the signal comprising a transmitted information signal superimposed on a high frequency RF carrier signal provided by the antenna (310). The bias voltage provided by the bias voltage generator (312) may be equal to the extinction voltage (611). Alternatively or additionally, the bias voltage provided by the bias voltage generator (312) may be substantially equal to the extinction voltage (611). Thereby, the optical electro-absorption modulator may act as a half-wave rectifier substantially modulating half of the signal comprising a transmitted information signal superimposed on a high frequency RF carrier signal (203) onto the optical signal from the light-source (314) to yield a signal (204, 605). (604) represents a part of the signal comprising a transmitted information signal superimposed on a high frequency RF carrier signal which is partly or wholly blocked by the optical electro-absorption modulator (301). (609) represents the optical electro-absorption modulator response to a voltage below or equal to the extinction voltage (611).

Alternatively, the bias voltage generator (312) may provide any bias voltage (608) to the optical electro-absorption modulator (301).

Figure 7:
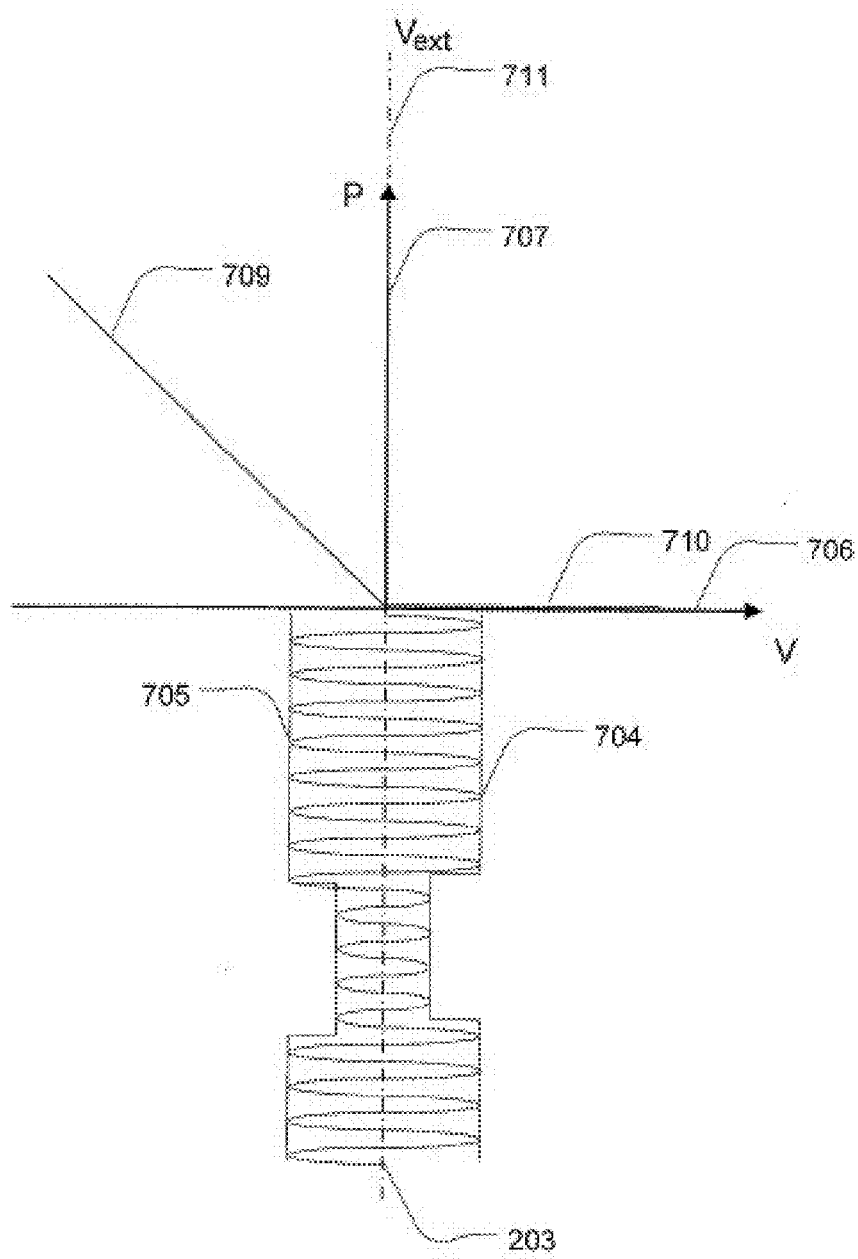
FIG. 7 schematically illustrates a response curve of an optical electro-absorption modulator having an extinction voltage equal to zero volts.

In an embodiment, schematically illustrated in FIG. 7, the optical electro-absorption modulator may have an extinction voltage equal to zero volts. Alternatively, the optical electro-absorption modulator may have an extinction voltage substantially equal to zero volts e.g. −0.05V-0.05V. Therefore, according to this embodiment of the invention, the optical electro-absorption modulator may not require a bias voltage thereby simplifying the optical electro-absorption modulator by not requiring the bias voltage generator (312). When the extinction voltage is equal to zero volts or substantially equal to zero volts, then the optical electro-absorption modulator (301) may modulate half of the signal comprising a transmitted information signal superimposed on a high frequency RF carrier signal (203), e.g. the half (705) of the signal, onto the optical signal provided by the light-source (314) thereby modulating the optical signal from the light-source (314) according to one half of the signal comprising a transmitted information signal superimposed on a high frequency RF carrier signal (203). The optical electro-absorption modulator (301) may further block the other half of the signal comprising a transmitted information signal superimposed on a high frequency RF carrier signal (203), e.g. the half (704) of the signal, thereby preventing the other half of the signal comprising a transmitted information signal superimposed on a high frequency RF carrier signal (203) from being modulated onto the optical signal from the light-source (314). Thereby, the optical electro-absorption modulator may act as a half-wave rectifier half-wave rectifying the signal comprising a transmitted information signal superimposed on a high frequency RF carrier signal (203) to the signal (204, 705) without the need of a bias voltage. In FIG. 7, the axis (706) illustrates a signal comprising a transmitted information signal superimposed on a high frequency RF carrier signal axis and the axis (707) illustrates the response of the optical electro-absorption modulator (301) to the signal comprising a transmitted information signal superimposed on a high frequency RF carrier signal the antenna (310).

In an embodiment where the optoelectronic device is a laser (301), an optical output signal from the laser may be modulated according to a bias voltage from the bias voltage generator (312) and/or the signal comprising a transmitted information signal superimposed on a high frequency RF carrier signal (203).

Figure 4A:
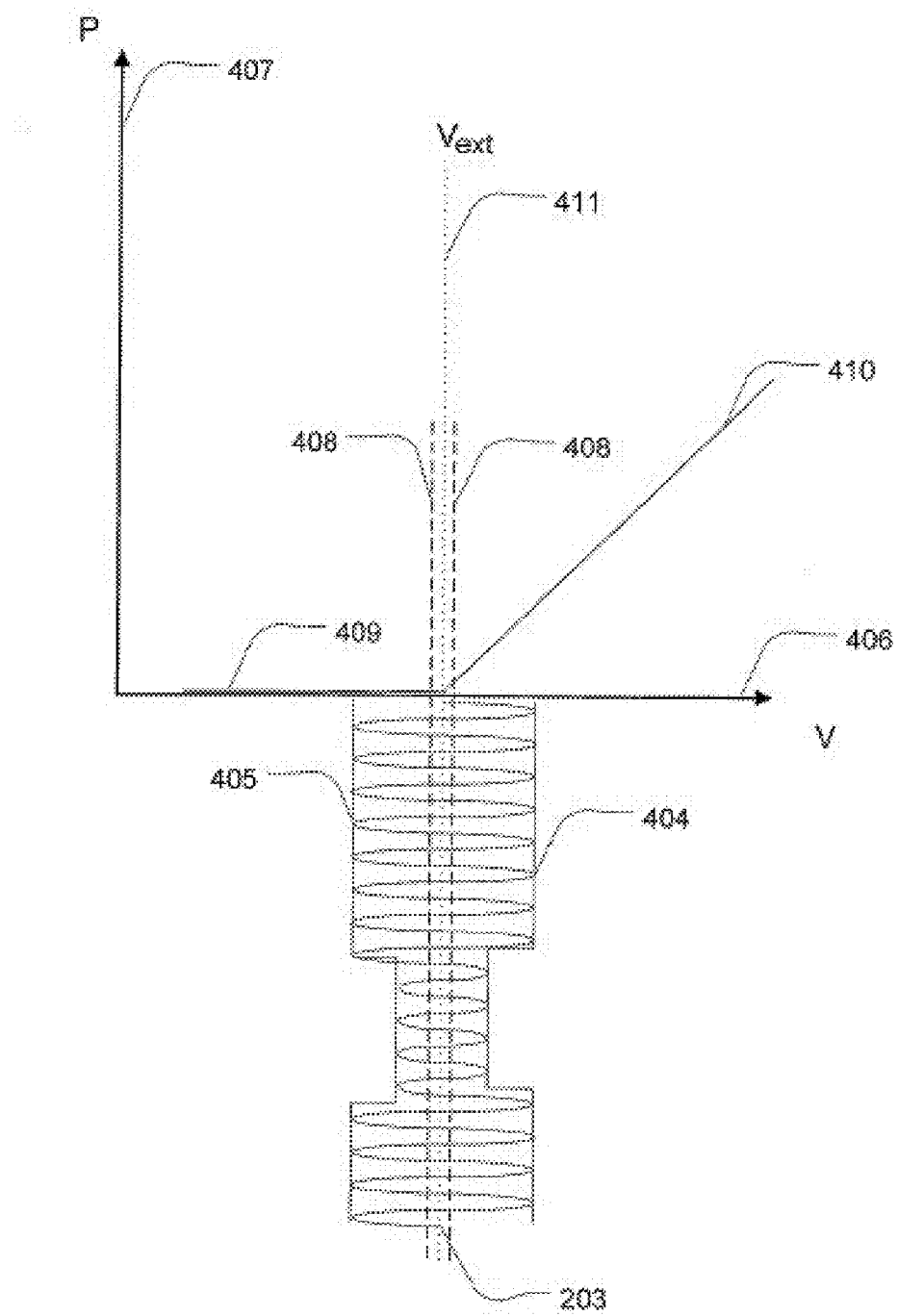
FIG. 4a schematically illustrates a response curve of a laser in which curve a bias voltage substantially is equal to a lasing voltage of the laser.

For example, in an embodiment schematically illustrated in FIG. 4a, the bias voltage generator (312) may provide a bias voltage (408) substantially equal to a lasing voltage (411) of the laser (301) such that said laser (301) modulates substantially half of the signal comprising a transmitted information signal superimposed on a high frequency RF carrier signal (203), e.g. the half (405) of the signal, onto the optical output signal from the laser (301) thereby modulating the optical output signal from the laser (301) according to substantially one half of the signal comprising a transmitted information signal superimposed on a high frequency RF carrier signal (203). The laser (301) may further substantially block the other half of the signal comprising a transmitted information signal superimposed on a high frequency RF carrier signal (203), e.g. the half (406) of the signal, thereby substantially preventing the other half of the signal comprising a transmitted information signal superimposed on a high frequency RF carrier signal (203) from being modulated onto the optical output signal from the laser (301). The lasing voltage may be defined as the voltage above, or at which the laser starts to emit laser light. Thereby, the laser may substantially act as a half-wave rectifier substantially half-wave rectifying the signal comprising a transmitted information signal superimposed on a high frequency RF carrier signal (203) to the signal (204, 404). In FIG. 4a, the axis (406) illustrates a bias voltage and/or signal comprising a transmitted information signal superimposed on a high frequency RF carrier signal axis and the axis (407) illustrates the response of the laser (301) to the bias voltage (408) and/or signal comprising a transmitted information signal superimposed on a high frequency RF carrier signal provided by the bias voltage generator (312) and/or antenna (310). (409) represents a laser response to a voltage below or equal to the lasing voltage (411) and (410) represents a laser response to a voltage above the lasing voltage (411).

Alternatively, the bias voltage generator (312) may provide any bias voltage (408) to the laser (301).

Figure 5A:
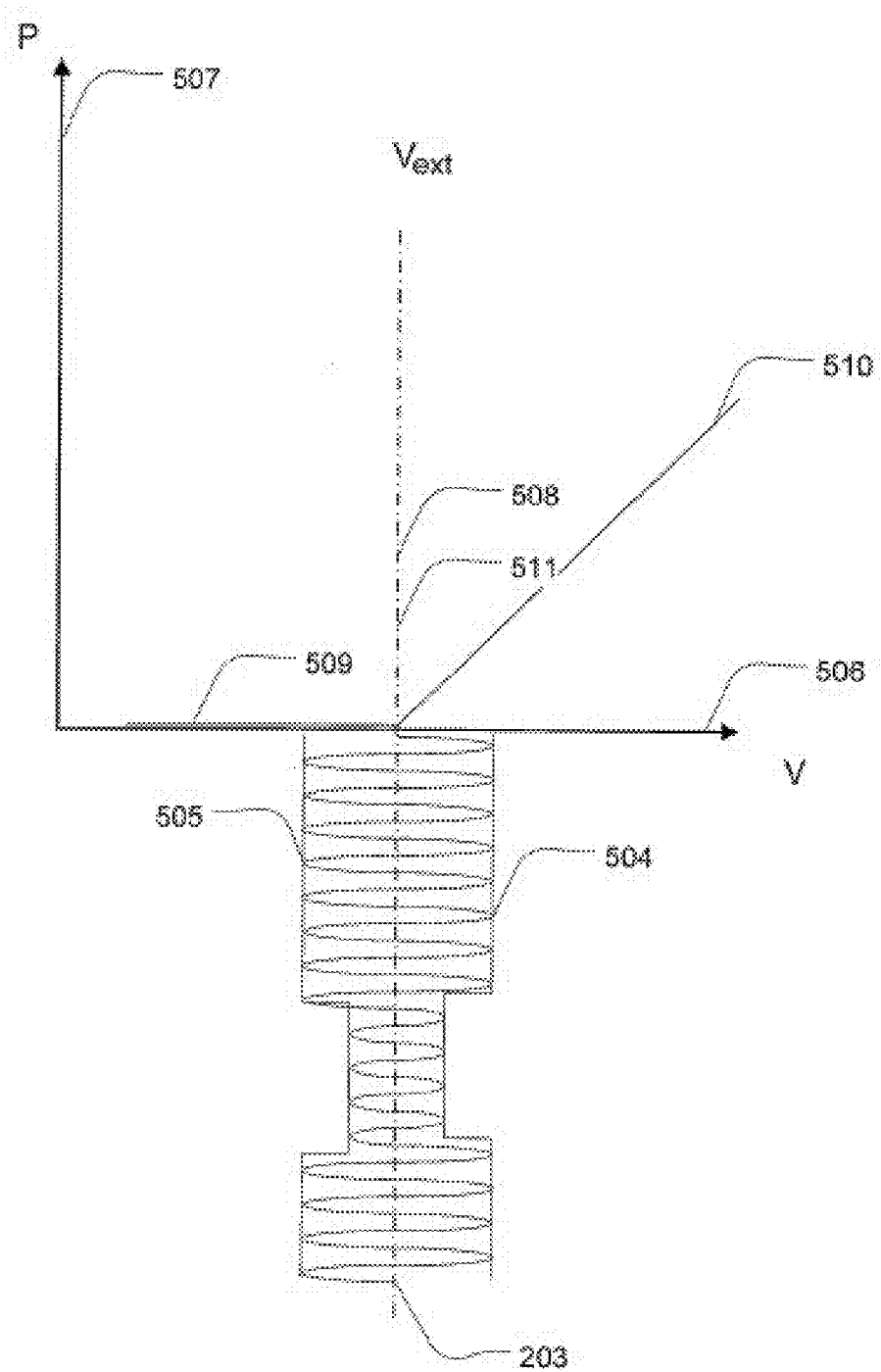
FIG. 5a schematically illustrates a response curve of a laser in which curve a bias voltage is equal to a lasing voltage of the laser.

In an embodiment, schematically illustrated in FIG. 5a, the bias voltage generator (312) may provide a bias voltage (508) equal to a lasing voltage (511) of the laser (301) such that said laser (301) modulates half of the signal comprising a transmitted information signal superimposed on a high frequency RF carrier signal (203), e.g. the half (504) of the signal, onto the optical output signal provided by the laser (301) thereby modulating the optical output signal from the laser (301) according to one half of the signal comprising a transmitted information signal superimposed on a high frequency RF carrier signal (203). The laser (301) may further block the other half of the signal comprising a transmitted information signal superimposed on a high frequency RF carrier signal (203), e.g. the half (505) of the signal, thereby preventing the other half of the signal comprising a transmitted information signal superimposed on a high frequency RF carrier signal (203) from being modulated onto the optical output signal from the laser (301). Thereby, the laser may act as a half-wave rectifier half-wave rectifying the signal comprising a transmitted information signal superimposed on a high frequency RF carrier signal (203) to the signal (204, 504). In FIG. 5, the axis (506) illustrates a bias voltage and/or signal comprising a transmitted information signal superimposed on a high frequency RF carrier signal axis and the axis (507) illustrates the response of the laser (301) to the bias voltage (508) and/or signal comprising a transmitted information signal superimposed on a high frequency RF carrier signal provided by the bias voltage generator (312) and/or the antenna (310). (509) represents a laser response to a voltage below or equal to the lasing voltage (511) and (510) represents a laser response to a voltage above the lasing voltage.

Alternatively, the bias voltage generator (312) may provide any bias voltage (508) to the laser (301).

Figure 6A:
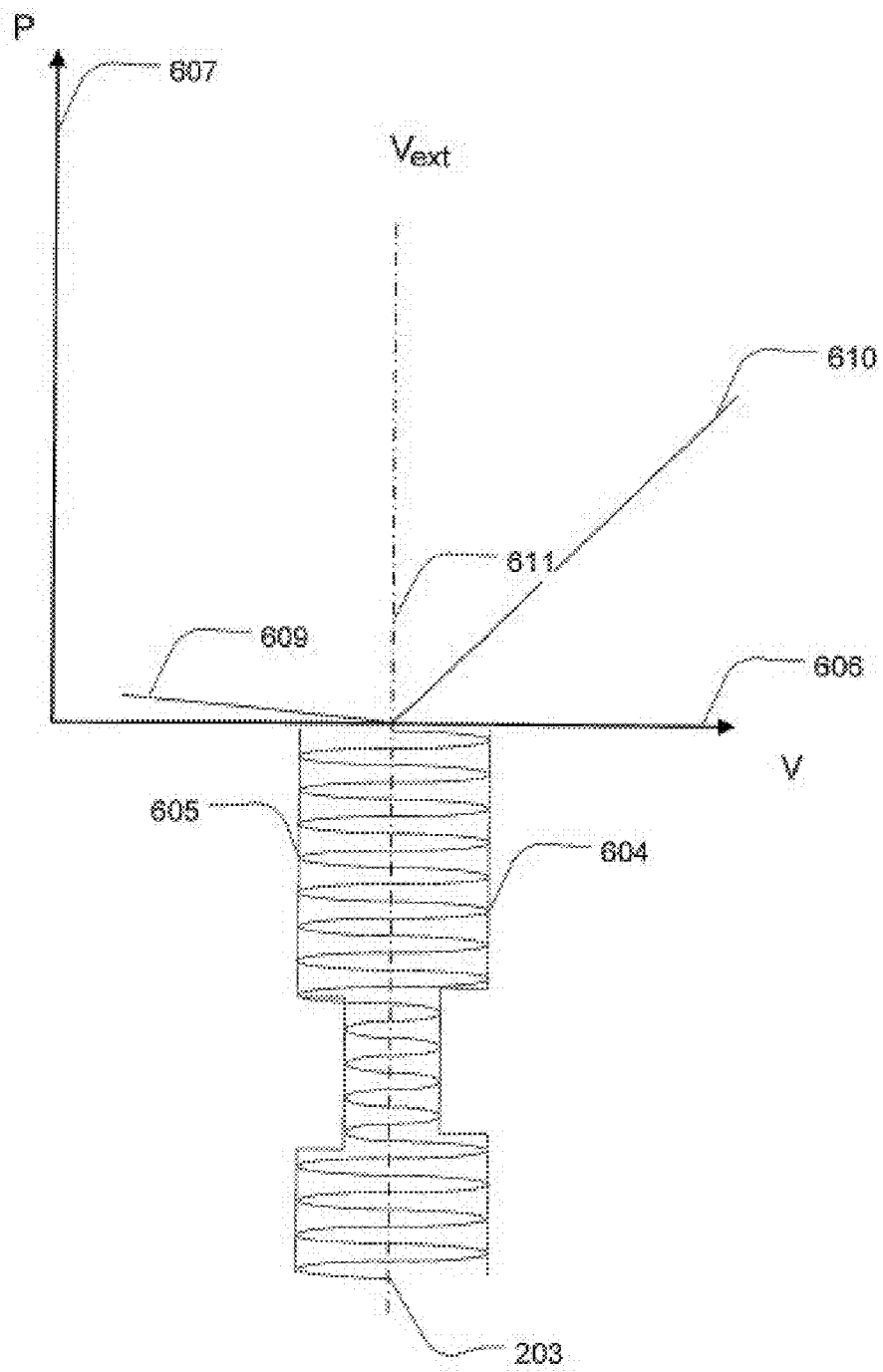
FIG. 6a schematically illustrates a response curve of a laser having a non-zero response above a lasing voltage.

In an embodiment, schematically illustrated in FIG. 6a, the laser (301) may have a non-zero response (609) below the lasing voltage (611). In FIG. 6, the axis (606) illustrates a bias voltage and/or signal comprising a transmitted information signal superimposed on a high frequency RF carrier signal axis and the axis (607) illustrates the response of the laser (301) to a bias voltage provided by the bias voltage generator (312) and/or the signal comprising a transmitted information signal superimposed on a high frequency RF carrier signal provided by the antenna (310). The bias voltage provided by the bias voltage generator (312) may be equal to the lasing voltage (611). Alternatively or additionally, the bias voltage provided by the bias voltage generator (312) may be substantially equal to the lasing voltage (611). Thereby, the laser may substantially act as a half-wave rectifier substantially modulating half of the signal comprising a transmitted information signal superimposed on a high frequency RF carrier signal (203) onto the optical output signal from the laser (301) to yield a signal (204, 604). Additionally, the laser (301) may further block the other half of the signal comprising a transmitted information signal, superimposed on a high frequency RF carrier signal (203), e.g. the half (605) of the signal, thereby preventing the other half of the signal comprising a transmitted information signal superimposed on a high frequency RF carrier signal (203) from being modulated onto the optical output signal from the laser (301). (610) represents the laser response to a voltage above the lasing voltage (611).

Alternatively, the bias voltage generator (312) may provide any bias voltage (608) to the laser (301).

Figure 7A:
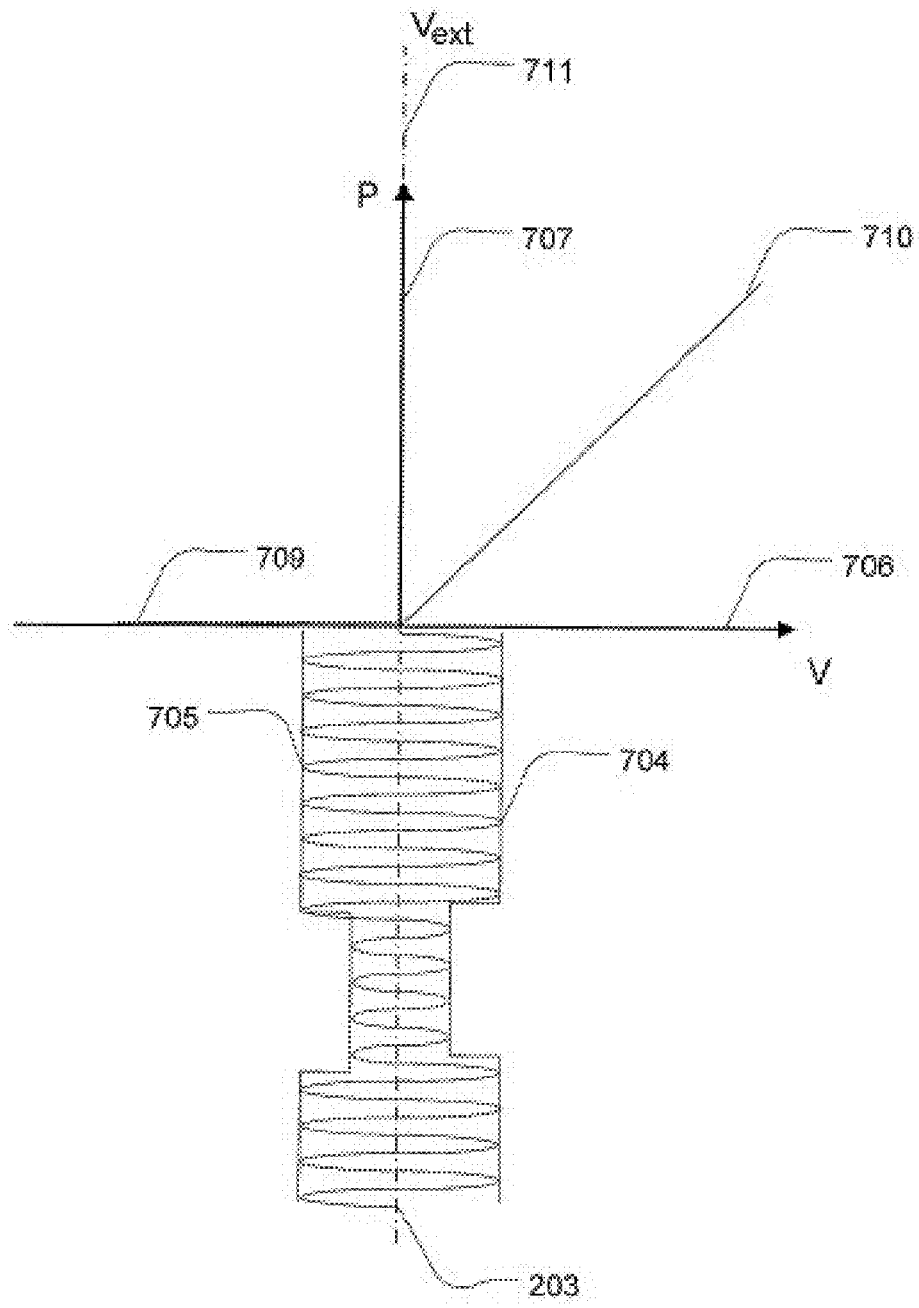
FIG. 7a schematically illustrates a response curve of a laser having an lasing voltage substantially equal to zero volts.

In an embodiment, schematically illustrated in FIG. 7a, the laser may have a lasing voltage (711) substantially equal to zero volts e.g. 0.5V or below. For example, the laser may be a Vertical-Cavity Surface-Emitting-Laser or a quantum dot laser. Therefore, according to this embodiment, the laser may require a bias voltage which may be close to 0V, for example equal to or below 0.5V. This may simplify the laser by requiring a small or infinitesimal bias voltage from the voltage generator (312). When the lasing voltage is substantially equal to zero volts, e.g. around or below 0.5V, then the laser (301) may modulate half of the signal comprising a transmitted information signal superimposed on a high frequency RF carrier signal (203), e.g. the half (704) of the signal, onto the optical output signal provided by the laser (301) thereby modulating the optical output signal from the laser (301) according to one half of the signal comprising a transmitted information signal superimposed on a high frequency RF carrier signal (203). The laser (301) may further block the other half of the signal comprising a transmitted information signal superimposed on a high frequency RF carrier signal (203), e.g. the half (705) of the signal, thereby preventing the other half of the signal comprising a transmitted information signal superimposed on a high frequency RF carrier signal (203) from being modulated onto the optical output signal from the laser (301). Thereby, the laser may act as a half-wave rectifier half-wave rectifying the signal comprising a transmitted information signal superimposed on a high frequency RF carrier signal (203) to the signal (204, 704) without the need of a bias voltage. In FIG. 7, the axis (706) illustrates a signal comprising a transmitted information signal superimposed on a high frequency RF carrier signal axis and the axis (707) illustrates the response of the laser (301) to the signal comprising a transmitted information signal superimposed on a high frequency RF carrier signal the antenna (310). (709) represents a laser response to a voltage below the lasing voltage (711) and (710) represents a laser response to a voltage above the lasing voltage (711).

The optical half-wave rectified and/or substantially half-wave rectified signal may be transmitted from the optoelectronic device, e.g. the optical electro-absorption modulator (301) or the laser (301), to the envelope detector (202).

In an embodiment, the envelope detector (202) may be a photo-detector. A photo-detector may e.g. be a device converting the optical output (204) from the optoelectronic device (301), representing the half-wave rectified transmitted information signal superimposed on a high frequency RF carrier signal, into an envelope signal (205) representing the transmitted information signal. The photo-detector may, for example, convert the optical half-wave rectified signal (204) from the optoelectronic device (301) into an electrical signal representing the transmitted information signal (205). The electrical output signal from the photo-detector may, for example, be transmitted further to e.g. a personal computer, a television, etc. In an additional embodiment, the envelope detector may be a photo-diode.

In an embodiment, the envelope detector (202) may an optoelectronic device.

For example, the envelope detector (202) may be a laser such as a Fabry-Perot lasers or a distributed feedback laser (DFB) or a distributed Bragg reflector (DBR) or the like provided the response of the laser, is fast enough to follow the envelope signal but slow enough such that it does not follow the high frequency carrier signal. An optical output from the optoelectronic device (301) may be applied to or as an optical input of the laser (202) acting as an envelope detector, whereby the optical output signal from the laser (202) acting as an envelope detector may be modulated according to the output signal from the optoelectronic device (301). If both the half-wave rectifier and the envelope detector are lasers, the optoelectronic device and the envelope detector constitutes an all-optical device.

In an other example, an optical electro-absorption modulator may be used as an envelope detector provided the response of the optical electro-absorption modulator is fast enough to follow the envelope signal but slow enough such that it does not follow the high frequency carrier signal.

In an embodiment, the envelope detector (202) may be a semiconductor optical amplifier. A semiconductor optical amplifier may e.g. be a device designed to have a low frequency response compared to the carrier frequency and thereby it may implement an all-optical envelope detector.

In an embodiment, a semiconductor optical amplifier may be used together with a second optical light signal for envelope detection via cross-gain modulation inside the semiconductor optical amplifier.

In an embodiment, an envelop detector may be implemented by monitoring a voltage current of a semiconductor optical amplifier.

The semiconductor optical amplifier may, for example, be an made from group III-V compound semiconductors such as GaAs/AlGaAs, InP/InGaAs, InP/InGaAsP and InP/InAlGaAs. Alternatively or additionally, the semiconductor optical amplifier may be made by any direct band gap semiconductors such as II-VI semiconductor compounds. A semiconductor optical amplifier may be integrated with an optical electro-absorption modulator on a chip. Alternatively or additionally, a semiconductor optical amplifier may be made from nano-photonic engineered materials such for example semiconductor quantum dots.

An optical output from said semiconductor optical amplifier may, for example, be transmitted via one or more optical cables to e.g. an optical backhaul system.

Figure 8:
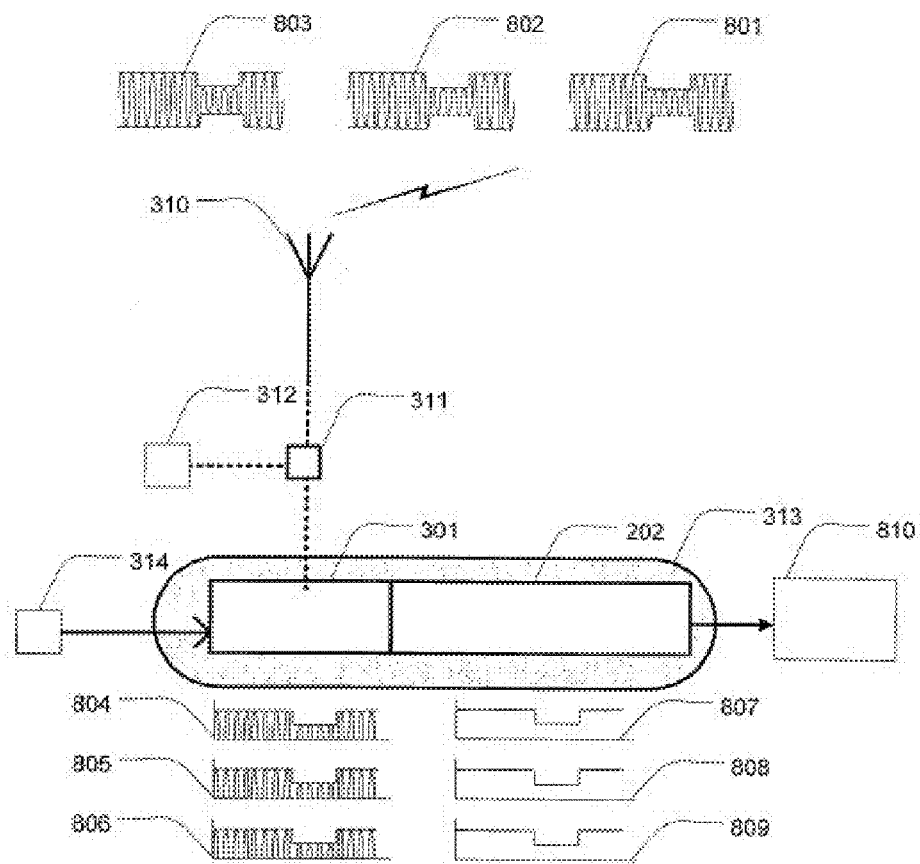
FIG. 8 schematically illustrates a device comprising an optical electro-absorption modulator, an envelope detector, an antenna, a bias voltage generator and a connector-box.

In an embodiment, schematically illustrated in FIG. 8, a device as illustrated in FIG. 3 comprising an optoelectronic device (301), an envelope detector (202), an antenna (310), a bias voltage generator (312) and a connector-box (311), receives one or more signals (801, 802, 803) comprising one or more transmitted information signals superimposed on one or more high frequency RF carrier signals via said antenna. Alternatively, the device of FIG. 8 may receive one or more signals comprising one or more transmitted information signal superimposed on one or more high frequency RF carrier signal (801, 802, and 803) via an optical cable and/or an electrical cable, as disclosed above. Optionally, the device of FIG. 8 may comprise a digital signal processing unit (810).

As mentioned above, the optoelectronic device (301) and the envelope detector (202) are indicated as a single component (313) but may be two separate components connected via e.g. a data cable, an electric cable and/or an optical cable and/or wirelessly e.g. via free-space optics.

The one or more signals (801, 802, 803) comprising one or more transmitted information signals superimposed on one or more high frequency RF carrier signals may be transmitted to e.g. an electrical input of the optoelectronic device, in which the one or more signals may be half-wave rectified into one or more half-wave rectified signals (804, 805, 806). From the optoelectronic device, the one or more half-wave rectified signals (804, 805, and 806) may be transmitted to the envelope detector (202) as an optical signal in which the envelope (807, 808, and 809) of the one or more half-wave rectified optical signals (804, 805, and 806) may be detected. In case the envelope detector, for example, provides an optical output signal representing the one or more detected envelope signals (807, 808, 809), e.g. if for example the envelope detector is a semiconductor optical amplifier, the one or more detected envelope signals (807, 808, 809) may, for example, be transmitted further on e.g. to a backhaul optical communication system. Alternatively, the one or more detected envelope signals (807, 808, 809) may be transmitted to the digital signalling processing unit (810), from where the one or more detected envelope signals (807, 808, 809) may be transmitted to a backhaul optical communication system. In case the envelope detector for example provides an electrical output signal representing the one or more detected envelope signals (807, 808, 809), e.g. if for example the envelope detector is a photo-diode, the one or more detected envelope signals (807, 808, 809) may, for example, be transmitted further on e.g. to a television. Alternatively, the one or more detected envelope signals (807, 808, 809) may be transmitted to the digital signalling processing unit (810), from where the one or more detected envelope signals (807, 808, 809) may be transmitted to e.g. a television.

In an embodiment, the received one or more signals comprising one or more transmitted information signals superimposed on one or more high frequency RF carrier signals may be coded using a medium access control (MAC) protocol. Alternatively, the received one or more signals comprising one or more transmitted information signals superimposed on one or more high frequency RF carrier signals may be coded using time division multiplexing (TDM). Alternatively, the received one or more signals comprising one or more transmitted information signals superimposed on one or more high frequency RF carrier signals may be coded using orthogonal frequency multiplexing (OFDM). Alternatively, the received one or more signals comprising one or more transmitted information signals superimposed on one or more high frequency RF carrier signals may be coded using any coding scheme. Alternatively, the received one or more signals comprising one or more transmitted information signals superimposed on one or more high frequency RF carrier signals may be un-coded.

The digital signal processing unit (810) after the envelope detector (202) may be used to recover/separate one or more detected envelope signals (807, 808, 809) encoded according to one or more of the abovementioned coding schemes. Alternatively, the digital processing unit may be comprised in a device receiving the one or more detected envelope signals (807, 808, 809) from the envelope detector (202) such as for example a television comprising a digital signal processing unit for recovering one or more detected envelope signals (807, 808, 809).

Figure 9:
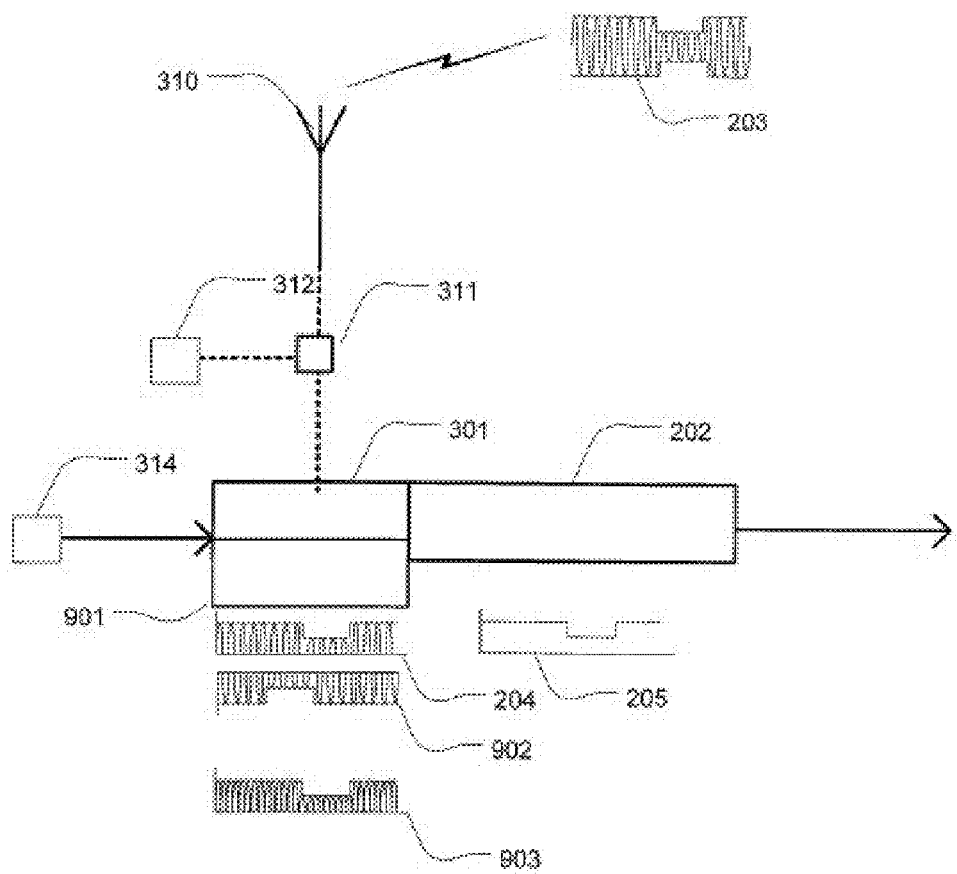
FIG. 9 schematically illustrates a device comprising a plurality of optical electro-absorption modulators.

In an embodiment, schematically illustrated in FIG. 9, a device may comprise a plurality of optoelectronic devices, for example a first optoelectronic device (301) and a second optoelectronic device (901). For example, the device may comprise two lasers or two optical electro-absorption modulators or a laser and an optical electro-absorption modulator. Each of the two optoelectronic devices may receive the same signal comprising a transmitted information signal superimposed on a high frequency RF carrier signal (203). The first optoelectronic device (301) may, for example, pass the positive half of the signal comprising a transmitted information signal superimposed on a high frequency RF carrier signal (203) and block the negative half of the signal thereby providing the signal (204), while the second optoelectronic device (901) may, for example, pass the negative half of the signal comprising a transmitted information signal superimposed on a high frequency RF carrier signal (203) and block the positive half of the signal thereby providing the signal (902). The signal (902) from the second optoelectronic device (901) may be inverted and added to the signal (204) of the first optoelectronic device (301) to yield a full-wave rectified signal (903) which may be transmitted to the envelope detector for detection of the transmitted information signal (205). As disclosed above, the envelope signal may be transmitted further and/or be processed in a digital processing unit.

Figure 10:
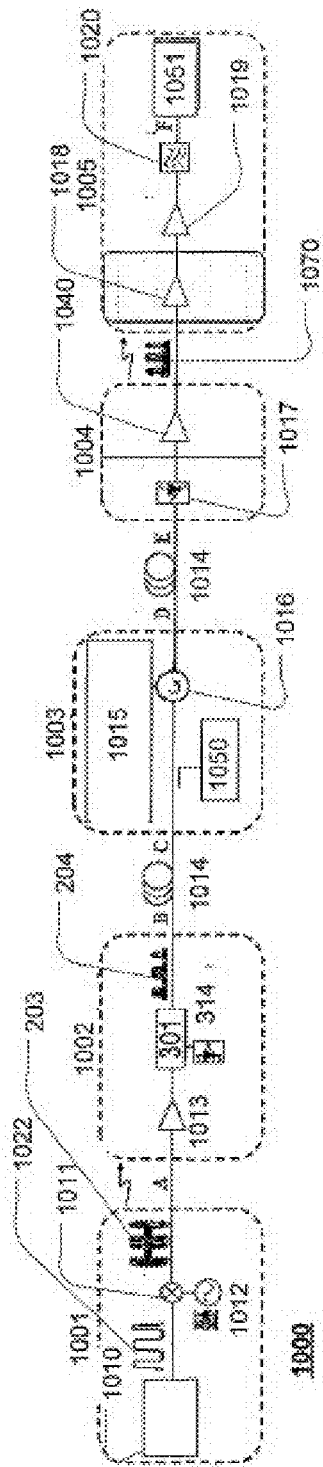
FIG. 10 shows a system in which a carrier frequency is recycled.

FIG. 10 shows a system in which a carrier frequency is recycled. The system 1000 comprises a central station 1001, a first base station 1002, a second base station 1004, an access point and a remote station 1005.

The central station 1001 may comprise a signal generator 1010 generating a first information signal 1022 for example a 1.25 Gb/s data signal. The central station 1001 further comprises a local oscillator 1012 generating a first high frequency RF carrier signal, for example a 38.8 GHz carrier signal. The first information signal 1022 and the first high frequency RF carrier signal may be mixed at the mixer 1011 providing a first information signal superimposed on a high frequency RF carrier signal 203. The first signal 203 may be wirelessly transmitted from the central station 1001 to the first base station 1002 via a wireless communication link at point A.

The first base station 1002 may comprise a bandpass amplifier operating at 38.8 GHz. The bandpass amplifier may ensure that the amplitude of the first information signal superimposed on a high frequency RF carrier signal is sufficient to be able to drive the an optoelectronic device 301 i.e. the bandpass amplifier may ensure that the optoelectronic device 301 is able to half-wave rectify the first information signal superimposed on a high frequency RE carrier signal. Additionally, the first base station 1002 may comprise an optoelectronic device 301 half-wave rectifying the first information signal superimposed on a high frequency RF carrier signal 203 to a first half-wave rectified signal 204. The optoelectronic device 301 may, for example, be an optical electro-absorption modulator 301 comprising a light-source 314 such as for example a laser source.

The first half-wave rectified signal 204 may be transmitted by the optoelectronic device 301 over, for example, an optical fiber 1014 from point B to an access point 1003 at point C. The access point 1003 may, for example, couple the signal 204 into a first arm comprising a first envelope detector 1021 (via e.g. a 3 dB coupler not illustrated in FIG. 10). The envelope detector may detect the signal 204.

A second arm of the access point is injected into a reflective semiconductor optical amplifier via an optical circulator and with enough optical power to saturate the gain of the semiconductor optical amplifier and thereby regenerate an equalised second high frequency RF carrier having the same frequency as the first high frequency RF carrier signal generated by the oscillator 1012. Thereby, the access point is able to regenerate a second high frequency RF carrier signal without the use of a local oscillator (local with respect to the access point) and the second high frequency RF carrier signal having a frequency equal to or substantially equal to the first high frequency RF carrier signal. The regenerated equalized second high frequency RF carrier signal may be modulated with a second information signal e.g. a second 1.25 Gb/s data signal thus providing a second information signal superimposed on a high frequency RF carrier signal. The second information signal superimposed on a high frequency RF carrier signal may be transmitted from the access point 1003 to a second base station 1004 via an optical fiber 1014 from point D to point E.

The second base station 1004 may comprise a photodiode 1017, e.g. a 40 GHz photodiode, and a broadband electrical amplifier 1040, e.g. a 40 GHz broadband electrical amplifier. In the second base station, the second information signal superimposed on a high frequency RE carrier signal may be converted from the optical regime to the electrical regime using the 40 GHz photodiode 1017 thus providing a first electrical signal. The first electrical signal may be amplified in the second base station 1004 using the broadband electrical amplifier. Due to the large bandwidth of the photodiode and the broadband electrical amplifier, the high-frequency component of the carrier signal is preserved and thus a 38.8 GHz wireless-ready signal comprising the second information signal superimposed on a high frequency RF carrier signal 1070 may subsequently be transmitted from the second base station 1004 to the remote station 1005 using a wireless communication link.

The remote station 1005 may comprise a band-pass amplifier 1018, a low-pass amplifier 1019, a low-pass filter 1020 for down-converting the frequency of the carrier signal from 38.8 GHz to 1.8 GHz and thus providing the second information signal in the second information signal superimposed on a high frequency RF carrier signal, 1051. Additionally, the remote station may jitter e.g. introduced into the second information signal superimposed on a high frequency RF carrier signal.

Figure 11:
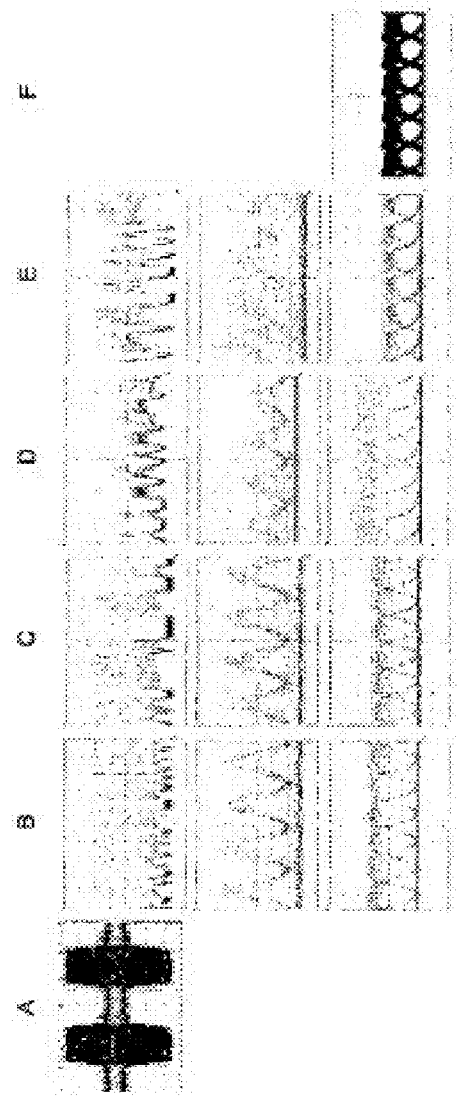
FIG. 11 shows bit pattern and eye diagrams of the signal at different locations in the system of FIG. 10.

FIG. 11 shows bit pattern and eye diagrams of the signal at different locations in the system of FIG. 10 i.e. at points A, B, C, D, E, and F. The two upper rows of FIG. 11 show optical signals. The upper row shows part of a 2^7-1 PRBS (Pseudo-random Bit Sequence) signal modulated at 1.25 Gb/s at points A, B, C, D, and E. The middle row shows the evolution of the high frequency RF carrier signal at points B, C, D, and E. Electrical signals are shown in the bottom row at points B, C, D, E, and F.

In general, any of the technical features and/or embodiments described above and/or below may be combined into one embodiment. Alternatively or additionally any of the technical features and/or embodiments described above and/or below may be in separate embodiments. Alternatively or additionally any of the technical features and/or embodiments described above and/or below may be combined with any number of other technical features and/or embodiments described above and/or below to yield any number of embodiments.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for detecting at least one first input signal superimposed on at least one second signal, the method comprising the steps of:
   providing said at least one first input signal superimposed on at least one second signal to at least one half-wave rectifier, wherein the at least one half-wave rectifier comprises at least one optoelectronic device;
   applying at least one bias voltage to at least one electrical input of said at least one optoelectronic device;
   selecting a magnitude of said at least one bias voltage equal to an extinction voltage of said at least one optoelectronic device;
   transforming, in said at least one half-wave rectifier, said at least one first input signal superimposed on at least one second signal into a half-wave rectified signal;
   providing said half-wave rectified signal to an envelope detector; and
   transforming, in said envelope detector, said half-wave rectified signal into an envelope signal.

2. The method of claim 1, wherein said at least one optoelectronic device is chosen from the group consisting of at least one optical electro-absorption modulator and at least one laser.

3. The method of claim 1, wherein the step of providing said at least one first input signal superimposed on at least one second signal to said at least one optoelectronic device comprises providing said at least one first input signal superimposed on at least one second signal to at least one first electrical input of said at least one optoelectronic device.

4. The method of claim 1, wherein the method further comprises the step of providing a light-source optical signal to at least one first optical input of said at least one optoelectronic device.

5. The method of claim 1, wherein said envelope detector is chosen from the group consisting of:
- a semiconductor optical amplifier;
- a photo-diode;
- a laser; and
- an optical electro-absorption modulator.

6. The method of claim 1, wherein the method further comprises the step of coupling an antenna electrically to said at least one first electrical input of said at least one optoelectronic device.

7. The method of claim 6, wherein the method further comprises the step of wirelessly receiving at least one signal comprising at least one first signal superimposed on at least one second signal with said antenna and providing said at least one received signal comprising at least one first signal superimposed on at least one second signal to at least one first electrical input of said at least one optoelectronic device.

8. The method of claim 1, wherein said at least one first input signal superimposed on at least one second signal comprises at least one modulation signal superimposed on at least one high frequency signal.

9. The method of claim 4, wherein said light-source is a laser source.

10. The method of claim 9, wherein said laser source emits light at a wavelength chosen from the group consisting of:
- 1510 nm-1590 nm
- 1260 nm-1340 nm.

11. A device for detecting at least one first input signal superimposed on at least one second signal, the device comprising
- at least one half-wave rectifier, the at least one half-wave rectifier comprising at least one optoelectronic device;
- an envelope detector; and
- at least one bias voltage generator operable to apply at least one bias voltage to at least one electrical input of said at least one optoelectronic device, said at least one bias voltage being equal to an extinction voltage of said at least one optoelectronic device;

wherein an output from said at least one half-wave rectifier comprising a half-wave rectified signal is provided to an input of said envelope detector.

12. The device of claim 11, wherein said at least one optoelectronic device is chosen from the group consisting of at least one optical electro-absorption modulator and at least one laser.

13. The device of claim 11, wherein said at least one first input signal superimposed on at least one second signal is provided to at least one first electrical input of said at least one optoelectronic device.

14. The device of claim 11, wherein the device further comprises at least one light-source providing at least one optical signal to said at least one optoelectronic device.

15. The device of claim 11, wherein said extinction voltage of said at least one optoelectronic device is substantially equal to zero volts.

16. The device of claim 11, wherein the envelope detector is chosen from the group of
- a semiconductor optical amplifier;
- a photo-diode;
- a laser; and
- an optical electro-absorption modulator.

17. The device of claim 11, wherein the device further comprises an antenna electrically connected to said at least one first electrical input of said at least one optoelectronic device.

18. The device of claim 17, wherein said antenna provides at least one wirelessly received signal comprising at least one first signal superimposed on at least one second signal to said at least one first electrical input of said at least one optoelectronic device.

19. The device of claim 18, wherein said at least one first input signal superimposed on at least one second signal comprises at least one modulation signal superimposed on at least one high frequency signal.

20. The device of claim 14, wherein said light-source is a laser source.

21. The device of claim 20, wherein said laser source emits light at a wavelength chosen from the group of:
- 1510 nm-1590 nm
- 1260 nm-1340 nm.

* * * * *